United States Patent
Lan et al.

(10) Patent No.: US 9,847,691 B2
(45) Date of Patent: Dec. 19, 2017

(54) POWER COLLECTION DEVICE FOR ELECTRIC MACHINE

(71) Applicant: INDUSTRIAL TECHNOLOGY RESEARCH INSTITUTE, Hsinchu Hsien (TW)

(72) Inventors: I-Wei Lan, Hsinchu (TW); Han-Ping Yang, Hsinchu (TW)

(73) Assignee: INDUSTRIAL TECHNOLOGY RESEARCH INSTITUTE and the nation, Hsinchu County (TW)

( * ) Notice: Subject to any disclaimer, the term of this patent is extended or adjusted under 35 U.S.C. 154(b) by 203 days.

(21) Appl. No.: 14/976,772

(22) Filed: Dec. 21, 2015

(65) Prior Publication Data
US 2017/0155298 A1 Jun. 1, 2017

(30) Foreign Application Priority Data
Nov. 26, 2015 (TW) .................................. 104139377

(51) Int. Cl.
| | |
|---|---|
| H02K 11/00 | (2016.01) |
| H02K 3/52 | (2006.01) |
| H02K 3/28 | (2006.01) |

(52) U.S. Cl.
CPC .............. *H02K 3/522* (2013.01); *H02K 3/28* (2013.01); *H02K 2203/09* (2013.01)

(58) Field of Classification Search
CPC ....... H02K 3/522; H02K 3/28; H02K 2203/09
(Continued)

(56) References Cited

U.S. PATENT DOCUMENTS

| 7,034,419 B2 | 4/2006 | Kabasawa et al. |
| 8,154,163 B2 | 4/2012 | Inoue et al. |
| | (Continued) | |

FOREIGN PATENT DOCUMENTS

| TW | 583811 | 4/2004 |
| TW | 201203797 | 1/2012 |
| | (Continued) | |

OTHER PUBLICATIONS

Ayman M. El-Refaie. "Motors/Generators for Traction/Propulsion Applications: A Review", IEEE Vehicular Technology Magazine, Mar. 2013, pp. 90-99.

(Continued)

*Primary Examiner* — Thanh Lam
(74) *Attorney, Agent, or Firm* — Amin, Turocy & Watson, LLP

(57) ABSTRACT

A power collection device includes a carrier and a connection portion integrated with or attached to the carrier. The connection portion has a via for a wire to pass therethrough, a first side being in contact and connection with the carrier, a second side opposite to the first side, and a third side connected with the first and second sides. The via is in a shape of a circle, rectangle, square, rhombus, triangle with one side being close to the second side, or triangle with one angle being close to the second side. The via has a maximum length in a direction parallel to the first side being ¼ to ¾ times a length of the first side, and a maximum length in a direction perpendicular to the first side being ¼ to ¾ times a length from the first side to the second side.

20 Claims, 8 Drawing Sheets

(58) Field of Classification Search
USPC .......................................................... 310/71
See application file for complete search history.

(56) References Cited

U.S. PATENT DOCUMENTS

| | | | |
|---|---|---|---|
| 8,492,947 | B2 | 7/2013 | Sasaki et al. |
| 8,766,497 | B2 | 7/2014 | Goto et al. |
| 2008/0265701 | A1 | 10/2008 | Ueda et al. |
| 2009/0039720 | A1* | 2/2009 | Tsukashima ............ H02K 3/522 310/71 |
| 2009/0256439 | A1* | 10/2009 | Inoue ..................... H02K 3/522 310/71 |
| 2012/0037436 | A1* | 2/2012 | Kwon ..................... H02K 3/50 180/65.1 |
| 2012/0126646 | A1* | 5/2012 | Nakagawa ............. H02K 3/522 310/71 |
| 2013/0069461 | A1* | 3/2013 | Arai ....................... H02K 3/522 310/71 |
| 2014/0319944 | A1* | 10/2014 | Tomita ................... H02K 3/522 310/71 |

FOREIGN PATENT DOCUMENTS

| | | |
|---|---|---|
| TW | I355788 | 1/2012 |
| TW | I393327 | 4/2013 |
| TW | 201431253 | 8/2014 |

OTHER PUBLICATIONS

J. S. Hsu, et al. "Report on Toyota/Prius Motor Design and Manufacturing Assessment", Oak Ridge National Laboratory, 2004, 15 pages.

Gurakuq Dajaku, et al. "Comparison of Two FSCW PM Machines for Integrated Traction Motor/Generator", IEEE International Electric Machines and Drives Conference (IEMDC-2015) May 2015, 187-194.

Greg Heins, et al. "Winding Factors and Magnetic Fields in Permanent Magnet Brushless Machines with Concentrated Windings and Modular Stator Cores", Energy Conversion Congress and Exposition (ECCE), Sep. 2013, 5048-5055.

Gurakuq Dajaku, et al. "Analysis of Different PM Machines with Concentrated Windings and Flux Barriers in Stator Core", 21st International Conference on Electrical Machines (ICEM'2014), Sep. 2014.

Mihail V. Cistelecan, et al. "Three phase tooth-concentrated multiple-layer fractional windings with low space harmonic content", IEEE on Energy Conversion Congress and Exposition (ECCE), 2010.

Taiwanese Office Action for Taiwanese Patent Application No. 104139377 dated Jul. 29, 2016.

* cited by examiner

POWER COLLECTION DEVICE FOR ELECTRIC MACHINE

CROSS-REFERENCE TO RELATED APPLICATION

The present disclosure is based on, and claims priority from, Taiwan Application Serial Number 104139377, field on Nov. 26, 2015, the disclosure of which is hereby incorporated by reference herein in its entirety.

TECHNICAL FIELD

The present disclosure relates to power collection devices for an electric machine, and, more particularly, to a power collection device for an electric machine having a carrier and a connection portion.

BACKGROUND

A typical power collection ring wire device uses a rivet as a wiring part of a power collection ring. However, the rivet, while in use, is likely to be loosened and fallen off Furthermore, if an additional mechanism is used to be in connection with the power collection ring and the wiring part, since the additional mechanism is presented between the power collection ring and the wiring part, a problem exists that the number and volume of electric machine parts are increased, such that the number of electric machine parts cannot be reduced or applied to an electric machine assembly that is required to be compact in size. Moreover, if a metal frame suitable for a flat wire is used, another problem exists that the wire has to be bent and is thus difficult to be dealt with.

Therefore, how to design a power collection device for an electric machine, particularly the aforesaid problems of the prior art is becoming an urgent issue.

SUMMARY

The present disclosure provides a power collection device for an electric machine, comprising: a carrier having an enclosed or a non-enclosed shape; and a connection portion integrated with or attached to and being in contact with the carrier, the connection portion having a via for a wire to pass therethrough, a first side being in contact and connection with the carrier, a second side opposite to the first side, and a third side being in connection with the first side and the second side, wherein the via is in a shape of a circle, a rectangle, a square, a rhombus, a triangle with one side being close to the second side, or a triangle with one angle being close to the second side, and has a maximum length in a direction parallel to the first side being ¼ to ¾ times a length of the first side, and a maximum length in a direction perpendicular to the first side being ¼ to ¾ times a length from the first side to the second side.

The power collection device for an electric machine provided according to the present disclosure has an advantage that the connection portion is not easily to be loosened and fallen off and the number and volume of the electric machine parts can be reduced due to a scenario that the connection portion is integrated with or being attached to and in contact with the carrier and has a via for a wire to pass therethrough. In addition, the power collection device for an electric machine provided according to the present disclosure can improve the production efficiency and facilitate automated production by providing the central axis of the via as the shape parallel to the carrier.

DETAILED DESCRIPTION

Figure 1A:
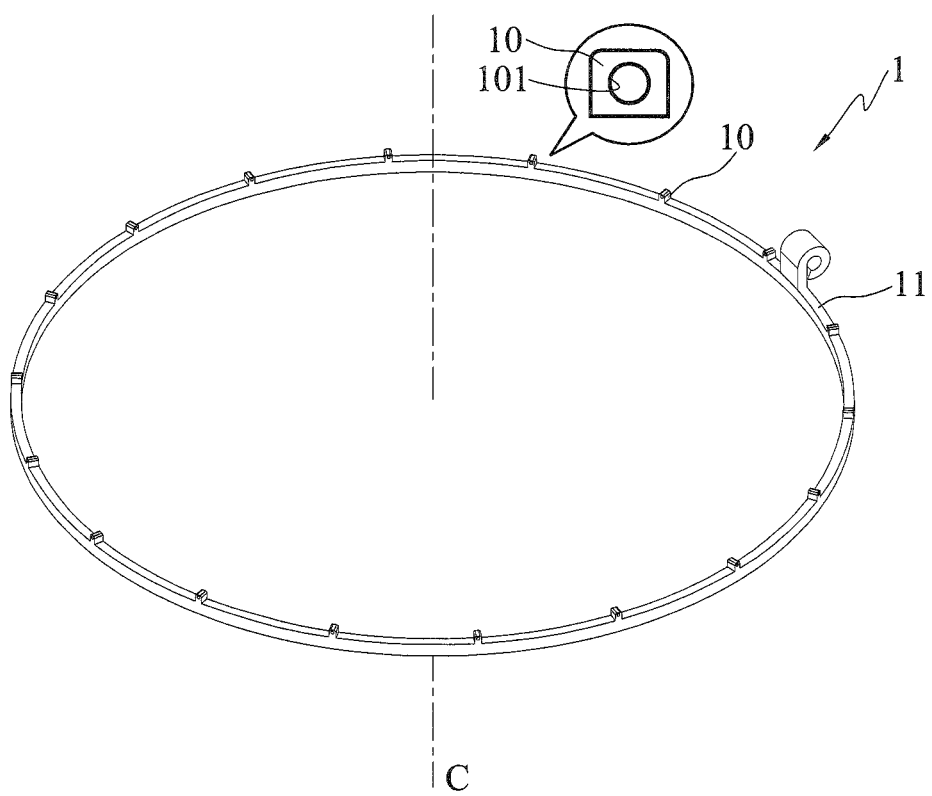
FIGS. 1A to 1D are schematic views showing various aspects of a power collection device for an electric machine according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIGS. 1A to 1D are schematic views showing various aspects of a power collection device 1 for an electric machine according to the present disclosure. As shown in FIG. 1A, the power collection device 1 comprises: a carrier 11 having an enclosed shape; and a connection portion 10. The carrier 11 as described above may have a rectangular or square cross section, and may be made of a conductive material. In an embodiment, the carrier 11 may be made of aluminum, aluminum alloy, copper, copper alloy, or other conductive materials. The connection portion 10 may be integrated with or be attached to and in contact with the carrier 11, and has a via 101 for a wire to pass therethrough. The connection portion 10 is integrated with the carrier 11. In other words, the connection portion 10 and the carrier 11 are processed and formed in a same bulk material. In an embodiment, the processing can be punch, line cutting, laser cutting, milling, turning, or a combination thereof. The bulk material is cut to a specific shape that the connection portion 10 is integrated with the carrier 11, and then the via 101 is formed in the connection portion 10. The via 101 can also be formed at a predetermined place prior to cutting the bulk material. While the carrier 11 has an enclosed ring shape, the bulk material may be a tube, and the cutting cuts the specific shape of the carrier 11 that is integrated with the connection portion 10 from the radial direction of the tube, and the via 101 is formed. In addition, the connection portion 10 is attached to and in contact with the carrier 11. In an embodiment, as the connection portion 10 and the carrier 11 are prepared, for example, the connection portion 10 is attached to and in contact with the carrier 11 by soldering, welding, bonding, or a combination thereof, and the via 101 may be formed prior to or after the attaching. Furthermore, the connection portion 10 may be made of a conductive and/or extendable material. In an embodiment, the connection portion 10 and the carrier 11 are made of the same material. Therefore, by the connection portion 10 that is integrated with or attached to and in contact with the carrier and has a via for a wire to pass therethrough, the present disclosure has advantages of not easily loosened and fallen off without increasing the number and volume of the electric machine parts, which can achieve the effect of reducing the volume of the wiring part for the power collection device for electric machine and reducing the mechanism connected between the carrier and the connection portion.

Figure 1B:
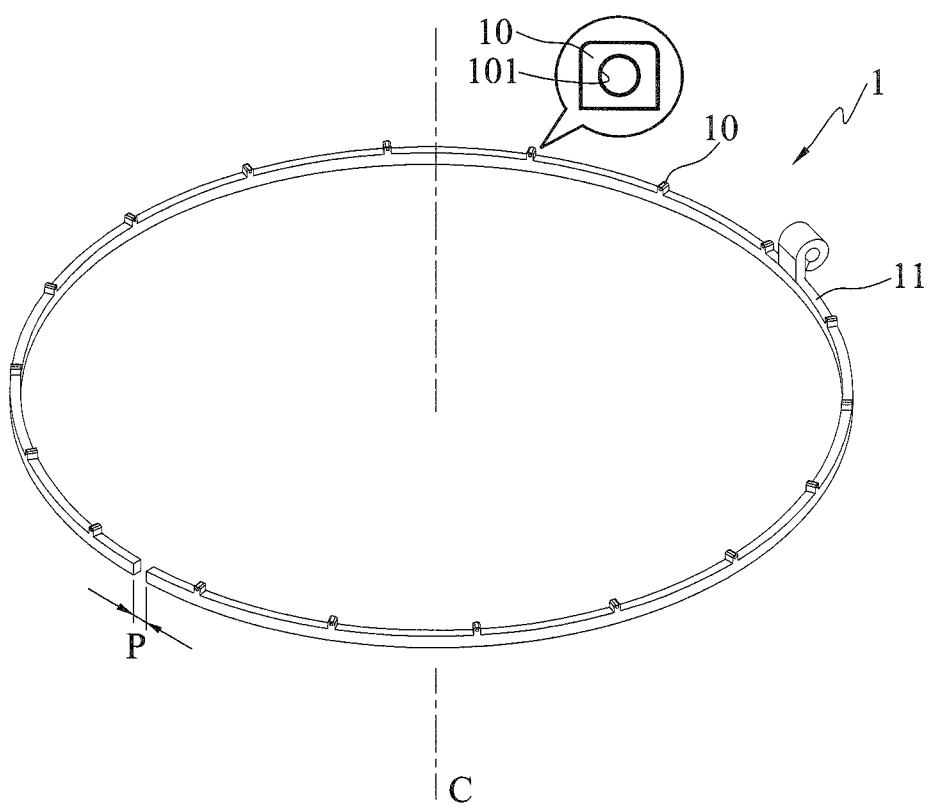

Refer to FIG. 1B, which differs from FIG. 1A in that in FIG. 1B a gap P is formed in the carrier 11, such that the carrier 11 has a non-enclosed ring shape.

Figure 1C:
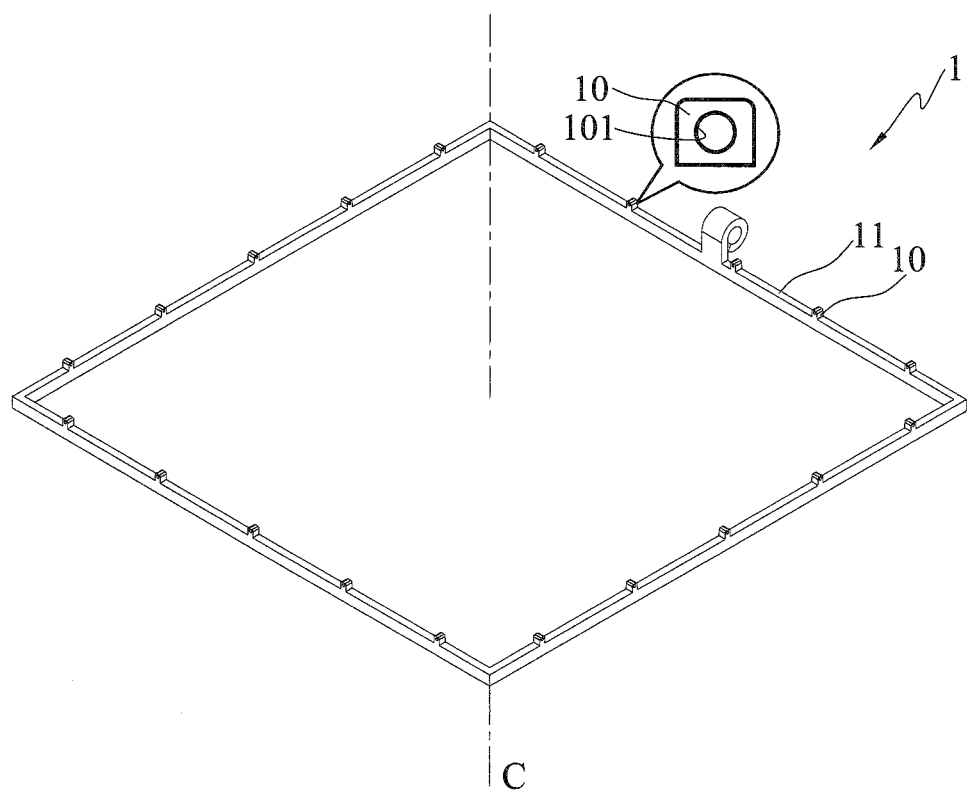

Refer to FIG. 1C, which differs from FIG. 1A in that the carrier 11 is an enclosed polygonal shape, and a gap P (referring to FIG. 1B) is formed in the carrier 11, such that the carrier 11 has a non-enclosed polygonal shape.

Figure 1D:
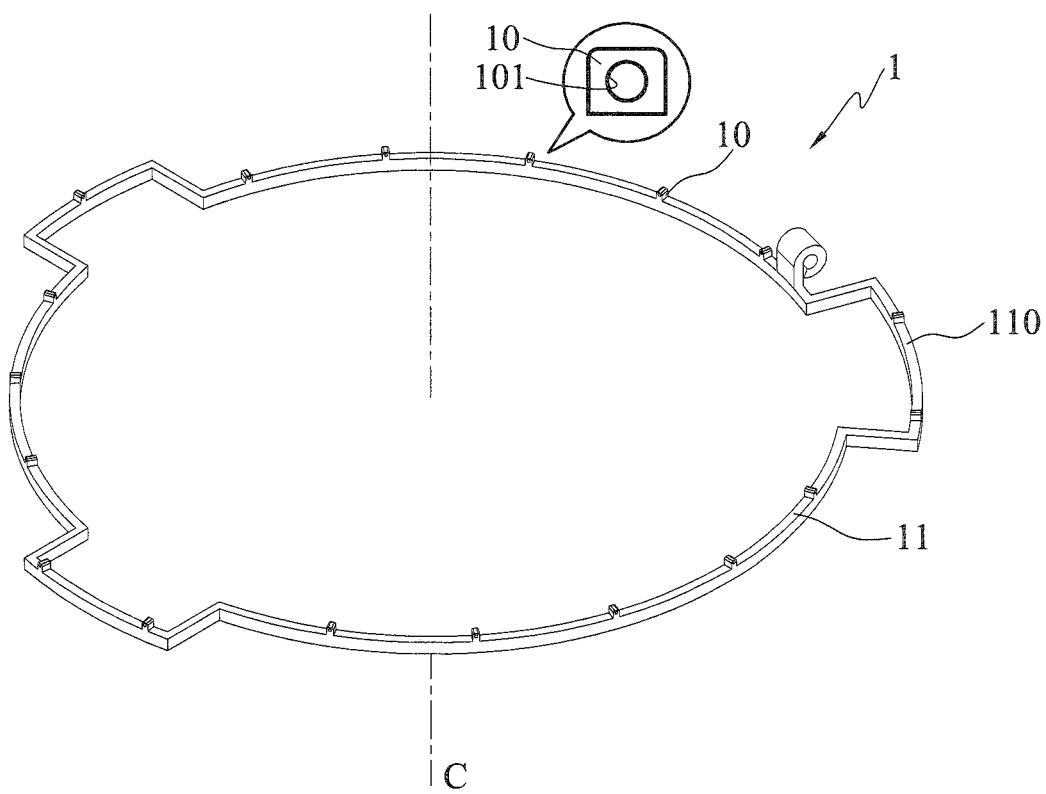

Refer to FIG. 1D, which differs from FIG. 1A in that the carrier 11 has an enclosed ring shape having a protruding portion 110, and a gap P (referring to FIG. 1B) is formed in the carrier 11, such that the carrier 11 has an enclosed ring shape having a protruding portion 110. In an embodiment, the carrier 11 may have an enclosed polygonal shape having a protruding portion 110 or a non-enclosed polygonal shape having a protruding portion 110.

If the carrier 11 has the non-enclosed shape, the bulk material is cut to a specific shape that the connection portion 10 is integrated with the linear carrier 11, and is bent into a ring shape, a polygonal shape, a non-enclosed polygonal shape with the protruding portion 110 or a non-enclosed ring shape with the protruding portion 110. The via 101 may be similarly formed prior to or after cutting. In the case that the connection portion 10 is attached to and in contact with the carrier 11, the connection portion 10 is attached to and in contact with the carrier 11 by soldering, welding, bonding, or a combination thereof prior to or after cutting, and the via 101 is formed.

In an embodiment, the central axis of the via 101 of the power collection device 1 according to the present disclosure may be perpendicular to the central axis of the enclosed or non-enclosed shape of the carrier 11. In an embodiment, the central axis of the via 101 is parallel to the enclosed or non-enclosed shape of the carrier 11. Therefore, the present disclosure provides the wire to pass through the via in a single direction by the central axis of the via parallel to the enclosed or non-enclosed shape of the carrier, thereby improving the production efficiency and facilitate automated production.

Figure 2A:
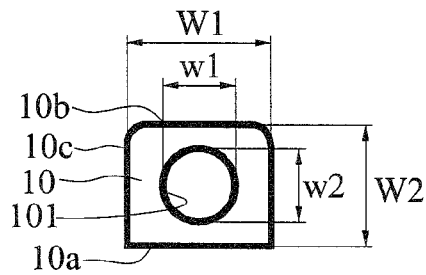
FIGS. 2A to 2E are schematic views showing various aspects of the shapes of the connection portion of the power collection device for an electric machine according to the present disclosure.
Figure 2B:
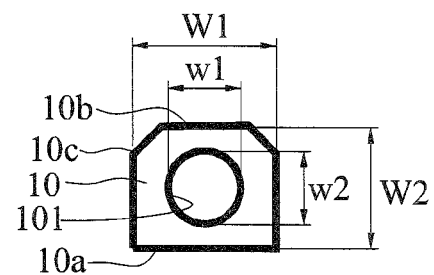
Figure 2C:
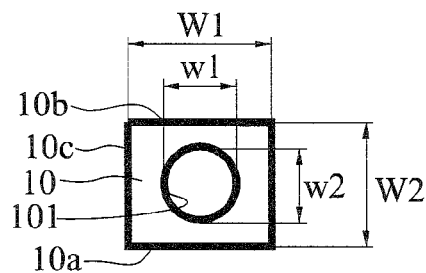
Figure 2D:
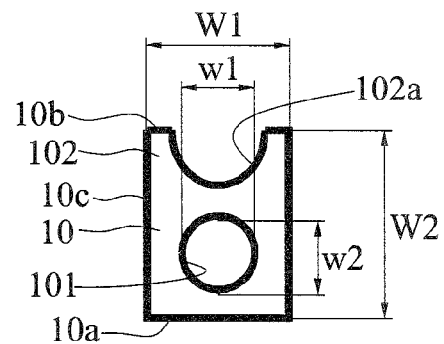
Figure 2E:
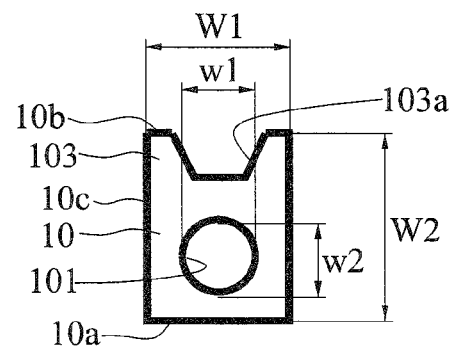

FIGS. 2A to 2E are schematic views showing various aspects of the shapes of the connection portion 10 of the power collection device 1 for an electric machine according to the present disclosure. As shown in FIG. 2A, the connection portion 10 according to the present disclosure has a first side 10a attached to and in connection with the carrier 11, a second side 10b opposite to the first side 10a, and a third side 10c in connection with the first side 10a and the second side 10b. The connection portion 10 may be substantially rectangular or square, and the second side 10b of the connection portion 10 connected with the third side 10c may form a curved outline. As shown in FIG. 2B, the connection portion 10 according to the present disclosure may be substantially rectangular or square, and the second side 10b of the connection portion 10 connected with the third side 10c may form an angle. As shown in FIG. 2C, the connection portion 10 according to the present disclosure may be substantially rectangular or square. As shown in FIG. 2D, the connection portion 10 according to the present disclosure may be substantially rectangular or square. A semi-circled recess 102a is formed in the second side 10b of the connection portion 10, and a protrusion 102 is formed at both ends of the second side 10b. As shown in FIG. 2E, the connection portion 10 according to the present disclosure may be substantially rectangular or square. A trapezoid recess 103a is formed in the second side 10b of the connection portion 10, and a protrusion 103 is formed at both ends of the second side 10b.

Figure 3A:
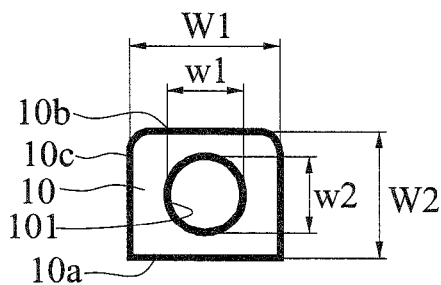
FIGS. 3A to 3E are schematic views showing various aspects of the shapes of the via of the power collection device for an electric machine according to the present disclosure.
Figure 3B:
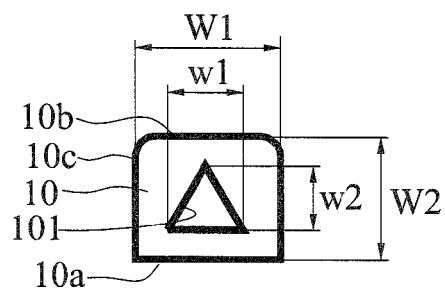
Figure 3C:
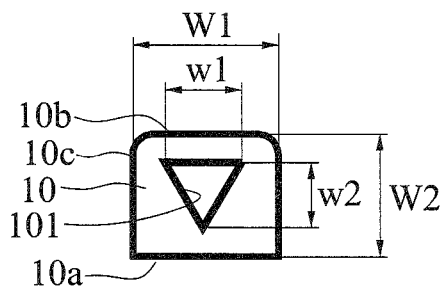
Figure 3D:
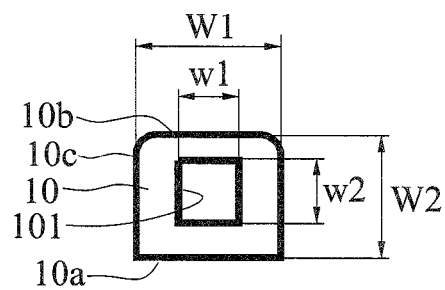
Figure 3E:
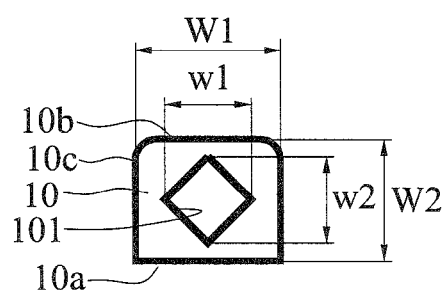

FIGS. 3A to 3E are schematic views showing various aspects of the shapes of the via 101 of the power collection device 1 for an electric machine according to the present disclosure. As shown in FIG. 3A, the via 101 according to the present disclosure may be circular. As shown in FIG. 3B, the via 101 according to the present disclosure may be a triangle with an angle being close to the second side 10b. As shown in FIG. 3C, the via 101 according to the present disclosure may be a triangle with a side being close to the second side 10b. As shown in FIG. 3D, the via 101 according to the present disclosure may be rectangular or square. As shown in FIG. 3E, the via 101 according to the present disclosure may be a rhombus.

In an embodiment, the maximum length w1 of the via 101 in the direction parallel to the first side 10a may be ¼ to ¾ times the length of the first side 10a, and a maximum length w2 of the via 101 in the direction perpendicular to the first side 10a may be ¼ to ¾ times the length from the first side 10a to the second side 10b.

The connection portion 10 has a first geometric center, and the via 101 has a second geometric center. According to formula (1), the distance between the first geometric center and the second geometric center in the direction parallel to the first side 10a is less than 0.5 times a difference between the length w1 of the first side 10a and the maximum length w1 of the via 101 in the direction parallel to the first side 10a. According to formula (2), the distance between the first geometric center and the second geometric center in the direction perpendicular to the first side 10a is less than 0.5 times a difference between the length w2 from the first side 10a to the second side 10b and the maximum length w2 of the via 101 in the direction perpendicular to the first side 10a.

Distance between the first geometric center and the second geometric center in the direction parallel to the first side $10a < 0.5*(W1-w1)$ (1)

Distance of the first geometric center and the second geometric center in the direction perpendicular to the first side $10a < 0.5*(W2-w2)$ (2)

Figure 4A:
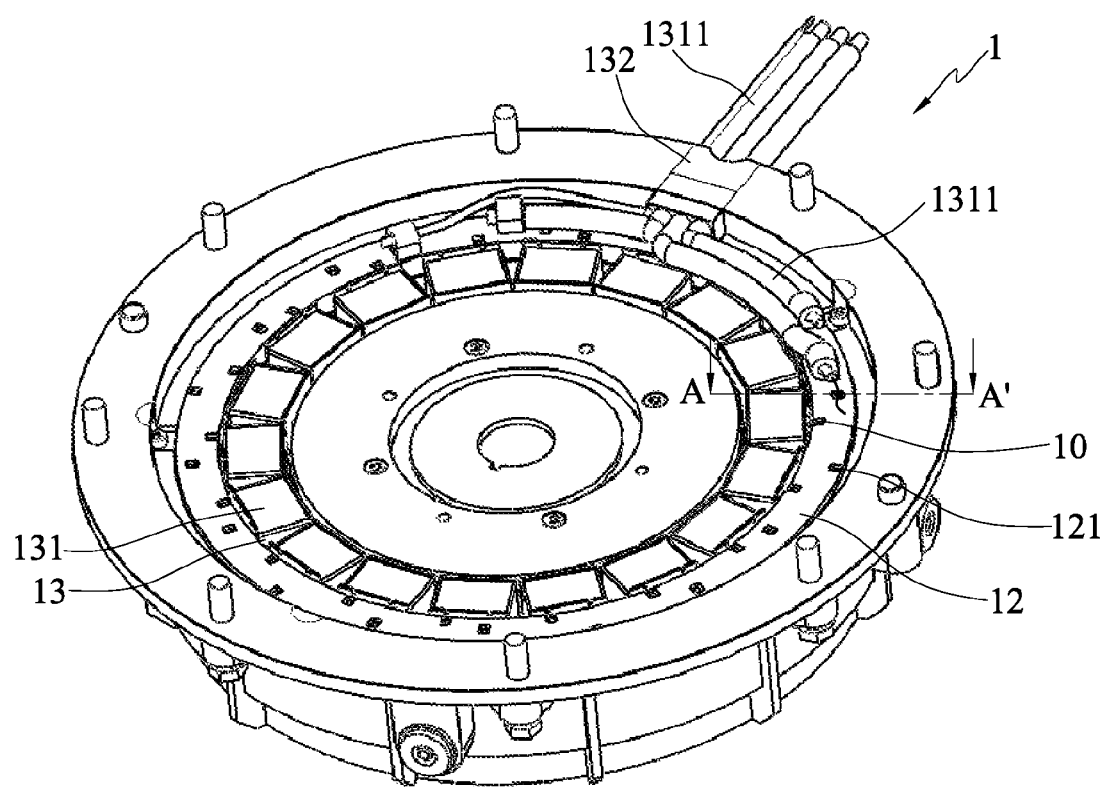
FIG. 4A is a schematic view showing assembly of the power collection device for an electric machine according to the present disclosure.
Figure 4B:
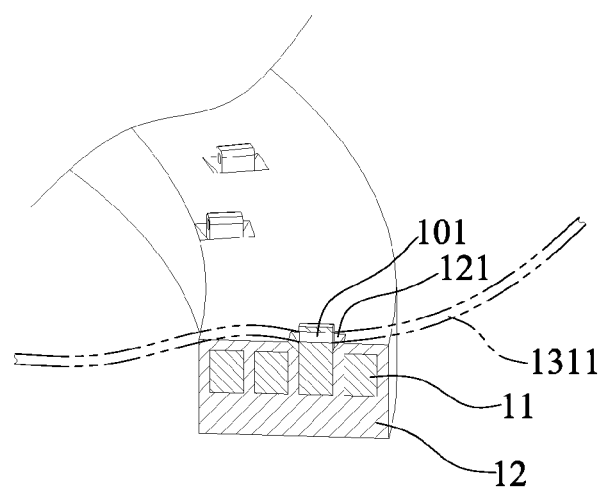
FIG. 4B is a cross sectional schematic view showing the insulation housing, the connection portion and the carrier along the AA' line of FIG. 4A.

FIG. 4A is a schematic view showing assembly of the power collection device 1 for an electric machine according to the present disclosure. The power collection device 1 may include an insulation housing 12 and a stator 13. The power collection device 1 may have a plurality of carriers 11 that are integrated with or attached to and in contact with the connection portion 10 for the purpose of collecting of a wire 1311 with a plurality of electrical output phases. The insulation housing 12 may at least cover a portion of the outer surface of the carrier 11. FIG. 4B is a cross sectional schematic view showing the insulation housing 12, the connection portion 10 and the carrier 11 along the AA' line of FIG. 4A. The insulation housing 12 covers an upper surface of the carrier 11, and the insulation housing 12 may have insulation housing openings 121 to expose the connection portions 10. In an embodiment, the stator 13 has a wire unit 131 for protruding the wire 1311, and the wire 1311 passes through the via 101, while the stator 13 is connected with the carrier 11 or the insulation housing 12 by, for example a special terminal, hook, latch, or bolt. The stator 13 may have a waterproof and dustproof fastener 132 for fastening the collecting wire 1311. Furthermore, the wire 1311 is threaded from the via 101, and the connection portion 10 can be deformed by a tool to fasten the wire 1311. Further, solder can be applied between the via 101 and the wire 1311.

Figure 5:
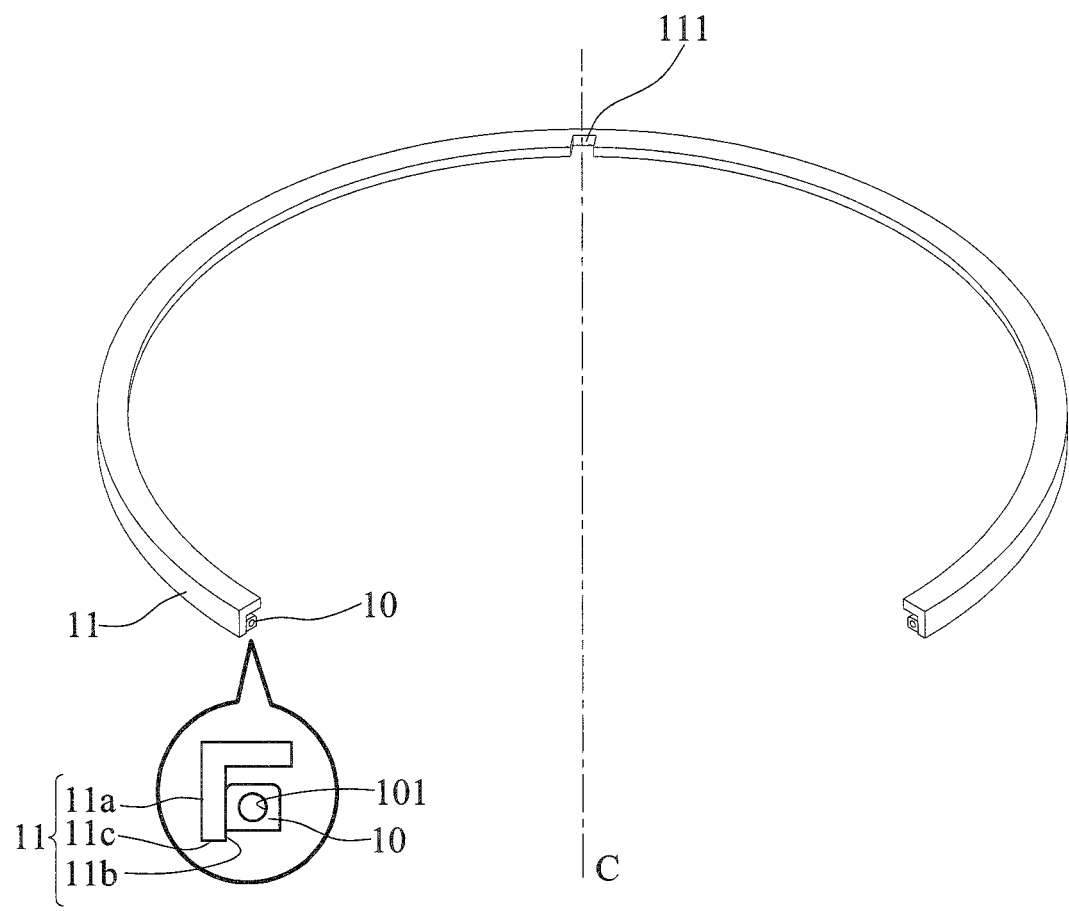
FIG. 5 is a schematic view showing another aspect of a power collection device for an electric machine according to the present disclosure.

FIG. 5 is a schematic view showing another aspect of the power collection device 1 for an electric machine according to the present disclosure. As shown in FIG. 5, the carrier 11 may have an L-shaped cross section. The carrier 11 has an inner surface 11b facing the central axis C of the carrier 11, an outer surface 11a opposite to the inner surface 11b, and a side surface 11c connected with the inner surface 11b and the outer surface 11a, and the inner surface 11b has the connection portion 10. The carrier may comprise a carrier opening 111 throughout the inner surface 11b and the outer surface 11a for the wire 1311 to pass therethrough (see FIG. 4).

In summary, by the connection portion that is integrated with or attached to and in contact with the carrier and has a via for a wire to pass therethrough, the present disclosure is not easily loosened and fallen off without increasing the number and volume of the electric machine parts, which can achieve the effect of reducing the volume of the wiring part for the power collection device for electric machine and reducing the mechanism connected between the carrier and the connection portion. Further, the present disclosure provides the wire threading the via in a single direction by the central axis of the via parallel to the enclosed or non-enclosed shape of the carrier, thereby improving the production efficiency and facilitate automated production.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A power collection device for an electric machine, comprising:
   a carrier; and
   a connection portion integrated with or attached to and being in contact with the carrier, the connection portion having a via configured for a wire to pass therethrough, a first side being in contact and connection with the carrier, a second side opposite to the first side, and a third side being in connection with the first side and the second side, wherein the via is in a shape of a circle, a rectangle, a square, a rhombus, a triangle with one side being close to the second side, or a triangle with one angle being close to the second side, and has a maximum length in a direction parallel to the first side being ¼ to ¾ times a length of the first side, and a maximum length in a direction perpendicular to the first side being ¼ to ¾ times a length from the first side to the second side.

2. The power collection device of claim 1, wherein the carrier has an enclosed shape.

3. The power collection device of claim 1, wherein the carrier has a non-enclosed shape.

4. The power collection device of claim 3, wherein the carrier has a gap to form the non-enclosed shape.

5. The power collection device of claim 1, wherein the carrier has an enclosed or a non-enclosed ring shape, a polygonal shape, a ring shape having a protruding portion, or a polygonal shape having a protruding portion.

6. The power collection device of claim 1, wherein the connection portion has a first geometric center, and the via has a second geometric center.

7. The power collection device of claim 6, wherein a distance between the first geometric center and the second geometric center in the direction parallel to the first side is less than 0.5 times a difference between the length of the first side and the maximum length of the via in the direction parallel to the first side.

8. The power collection device of claim 6, wherein a distance between the first geometric center and the second geometric center in the direction perpendicular to the first side is less than 0.5 times a difference between the length from the first side to the second side and the maximum length of the via in the direction perpendicular to the first side.

9. The power collection device of claim 1, wherein the connection portion is made of a conductive material.

10. The power collection device of claim 1, wherein the connection portion is made of an extensible material.

11. The power collection device of claim 10, wherein the connection portion is configured to be deformed to secure the wire.

12. The power collection device of claim 1, further comprising an insulation housing covering at least a portion of an outer surface of the carrier.

13. The power collection device of claim 12, wherein the insulation housing has an opening to expose the connection portion.

14. The power collection device of claim 12, further comprising a stator connected with the carrier or the insulation housing, and has a wire unit configured to protrude from the wire.

15. The power collection device of claim 14, wherein the connection portion is configured to be deformed to secure the wire.

16. The power collection device of claim 12, further comprising solder configured to be applied between the via and the wire.

17. The power collection device of claim 1, wherein the via has a central axis perpendicular to a central axis of the carrier.

18. The power collection device of claim 1, wherein the carrier has an L-shaped cross section, an inner surface facing a central axis of the carrier, an outer surface opposite to the inner surface, and a side surface connected with the inner surface and the outer surface.

19. The power collection device of claim 18, wherein the connection portion is disposed on the inner surface of the carrier.

20. The power collection device of claim 18, wherein the carrier further comprises a carrier opening penetrating throughout the inner surface and the outer surface.

* * * * *